United States Patent
Cheeniyil et al.

(10) Patent No.: US 7,406,424 B2
(45) Date of Patent: Jul. 29, 2008

(54) MIGRATION OF A WORKFLOW SYSTEM TO CHANGED PROCESS DEFINITIONS

(75) Inventors: Lakshmi Kutty Cheeniyil, Bangalore (IN); Srivatsa Krishnaswamy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 905 days.

(21) Appl. No.: 09/943,027

(22) Filed: Aug. 29, 2001

(65) Prior Publication Data
US 2003/0078957 A1   Apr. 24, 2003

(51) Int. Cl.
*G06Q 10/00*  (2006.01)

(52) U.S. Cl. .............................. 705/1; 705/7; 717/108; 717/122; 717/139; 717/168

(58) Field of Classification Search ................. 717/120, 717/108, 122, 139, 168; 705/1, 7
See application file for complete search history.

(56) References Cited

U.S. PATENT DOCUMENTS

| | | | | |
|---|---|---|---|---|
| 4,558,413 A * | 12/1985 | Schmidt et al. | ............. | 707/203 |
| 4,809,170 A * | 2/1989 | Leblang et al. | ............. | 717/122 |
| 5,974,389 A * | 10/1999 | Clark et al. | ................... | 705/3 |
| 6,021,272 A * | 2/2000 | Cahill et al. | ................ | 717/147 |
| 6,256,675 B1 * | 7/2001 | Rabinovich | ................. | 709/241 |
| 6,256,773 B1 * | 7/2001 | Bowman-Amuah | ......... | 717/121 |
| 6,262,976 B1 * | 7/2001 | McNamara | ................. | 370/254 |
| 6,415,284 B1 * | 7/2002 | D'Souza et al. | ................ | 707/3 |
| 6,425,125 B1 * | 7/2002 | Fries et al. | ................... | 717/168 |
| 6,442,663 B1 * | 8/2002 | Sun et al. | ..................... | 711/202 |
| 6,499,137 B1 * | 12/2002 | Hunt | .......................... | 717/164 |
| 6,622,126 B1 * | 9/2003 | McArdle et al. | .............. | 705/26 |
| 6,629,081 B1 * | 9/2003 | Cornelius et al. | ............. | 705/30 |
| 6,701,345 B1 * | 3/2004 | Carley et al. | ................ | 709/205 |
| 6,701,514 B1 * | 3/2004 | Haswell et al. | ............. | 717/115 |
| 6,704,873 B1 * | 3/2004 | Underwood | ................. | 726/12 |
| 6,769,121 B1 * | 7/2004 | Koyama et al. | ............. | 718/100 |
| 6,907,546 B1 * | 6/2005 | Haswell et al. | ................ | 714/38 |
| 6,957,186 B1 * | 10/2005 | Guheen et al. | ................. | 705/1 |
| 2002/0069399 A1 * | 6/2002 | Miloushey et al. | .......... | 717/108 |
| 2003/0023472 A1 * | 1/2003 | Lee et al. | ........................ | 705/8 |
| 2003/0078825 A1 * | 4/2003 | Cope | ............................. | 705/8 |

FOREIGN PATENT DOCUMENTS

EP            0903678            3/1999

OTHER PUBLICATIONS

Mark Vernon, "Alcatel Bell telephone", Mar./Apr. 1997, Document World, ABI/INFORM Global, p. 52.*

Business/Technology Editors, "PCSI Announces Transamerica Flood Hazard Certification Migration to SQL Server 7.0", Nov. 6, 1998, Business Wire, New York, p. 1.*

(Continued)

*Primary Examiner*—Naresh Vig

(57) ABSTRACT

For migrating a work flow in a workflow management system having at least one process instance executing an original process definition, each process instance is checked during the execution of the original process definition whether the process instance meets the migration condition. If the migration condition is met, the corresponding process instance is migrated to a modified process definition while executing the original definition.

4 Claims, 4 Drawing Sheets

OTHER PUBLICATIONS

Tutorial: A Little Help With nmake, Dec. 28, 1995, © Lucent Technologies.*

Kradolfer M et al:"Dynamic Workflow Schema Evolution Based On Workflow Type Versioning And Workflow Migration" Cooperative Information Systems,1999;IEEE Comput. Soc, US, Sep. 2, 1999;pp. 104-114.

Ellis C et al Association For Computing Machinery:"Dynamic Change Within Workflow Systems";Conference on Organisational Computing Systems;Milpitas,CA.,Aug. 13, 1995;pp. 10-21.

* cited by examiner

MIGRATION OF A WORKFLOW SYSTEM TO CHANGED PROCESS DEFINITIONS

BACKGROUND OF THE INVENTION

This invention relates to a method for migrating a process instance executing as per an original process definition in a workflow management system, to continue to execute as per a changed process definition.

Workflow is usually applied in high-volume applications with well-defined business rules. Examples are the treatment of insurance claims or tax-forms filed by public. Workflow is also applicable in organizations wherein primary task of work flow is a consistent application of a process across a wide customer base. Workflow is also applied to execute highly structured internal processes like travel approvals, check requests and marketing material developments.

In a workflow world, there are process definitions and actual instances of these definitions called process instances or simply processes. These instances may be 'enacted' by a Process Engine (PE) which is part of any workflow management system (WFMS). A process definition may include a number of steps called work nodes, some decision making nodes (or route nodes) and loops called reset arcs. Activities may be initiated in work nodes and executed by participants which are also known as Business Objects (BOs). These BOs can be human and/or IT resources.

However, the method for executing a process instance according to the current state of the art essentially remains static. A Process definition describing the business process has to be highly accurate and perfect from the beginning.

In the following scenarios, disadvantages and problems of the state of the art are described.

It is often not possible or not desirable to describe a business process so formalised and detailed enough so as to obtain a process definition from which process instances can be instantiated. Reasons for this may be lack of detailed knowledge about the process or the business problem or even unavailability of the required resources to perform a proper analysis and design of a process. Other difficulties may simply be due to time or economical constraints.

Furthermore, considering and implementing all potential exceptions within a business process might not be technically feasible. Also, this may lead to a very complex process definition. This may also prevents the creation of a precise enough process definition to be used by the workflow manager.

Many organisations do also not take enough time to document their processes and therefore have no ability to translate a process into automation. Others are in volatile business situation, in which no process can be followed. Problems also arise for organisations that have some process orientation but do not apply this process orientation consistently.

Moreover, with the current state of art, if flaws are detected in a business process definition while running its instances, it is complicated or even not possible to realise changes in the execution path of the instances when the original definition is changed.

SUMMARY OF THE INVENTION

It is thus an object of the present invention to provide a method for executing a work flow with an enhanced flexibility of migrating the said process instance to a modified process definition.

According to one aspect of the invention, there is provided a method for executing a process instance in a work flow as per an initial process definition. As a first step for migrating to a modified process definition, each process instance is checked during it's enactment whether the process instance meets migration conditions. If the migration conditions are met, the corresponding process instance is migrated to a modified process definition.

The invention achieves an enhanced flexibility with respect to the needed process definition since the user of the workflow system is no longer restricted to start and continue a process with a rigid and highly designed process definition. He may also start, in a first step, with a best-effort description of the business process definition and interact and modify it later even if some processes are already running as per the original definition. In a second step, during the enactment of the said process instances he may choose to migrate them to execute as per modified definition. This is particularly important if the executed processes are long lasting.

The invention may be implemented in a work flow manager running on a computer.

DESCRIPTION OF THE PREFERRED EMBODIMENTS

Preferred embodiments of this invention and modifications thereof will now be described with reference to the accompanying drawings.

A method for executing a workflow in a WFMS according to the invention starts with defining an original process definition P, which describes a business process and which is enacted by the different process instances.

In this context it should be mentioned that the process definition can in general describe and simulate any kind of process, in particular any technical process, e.g. a process for manufacturing any kind of devices. Thus, the process workflow can generally describe any kind of process which includes a plurality of processing steps.

As explained in the following, the original process definition may be a provisional in such a way that it may be modified during the execution of the instances.

Figure 1:
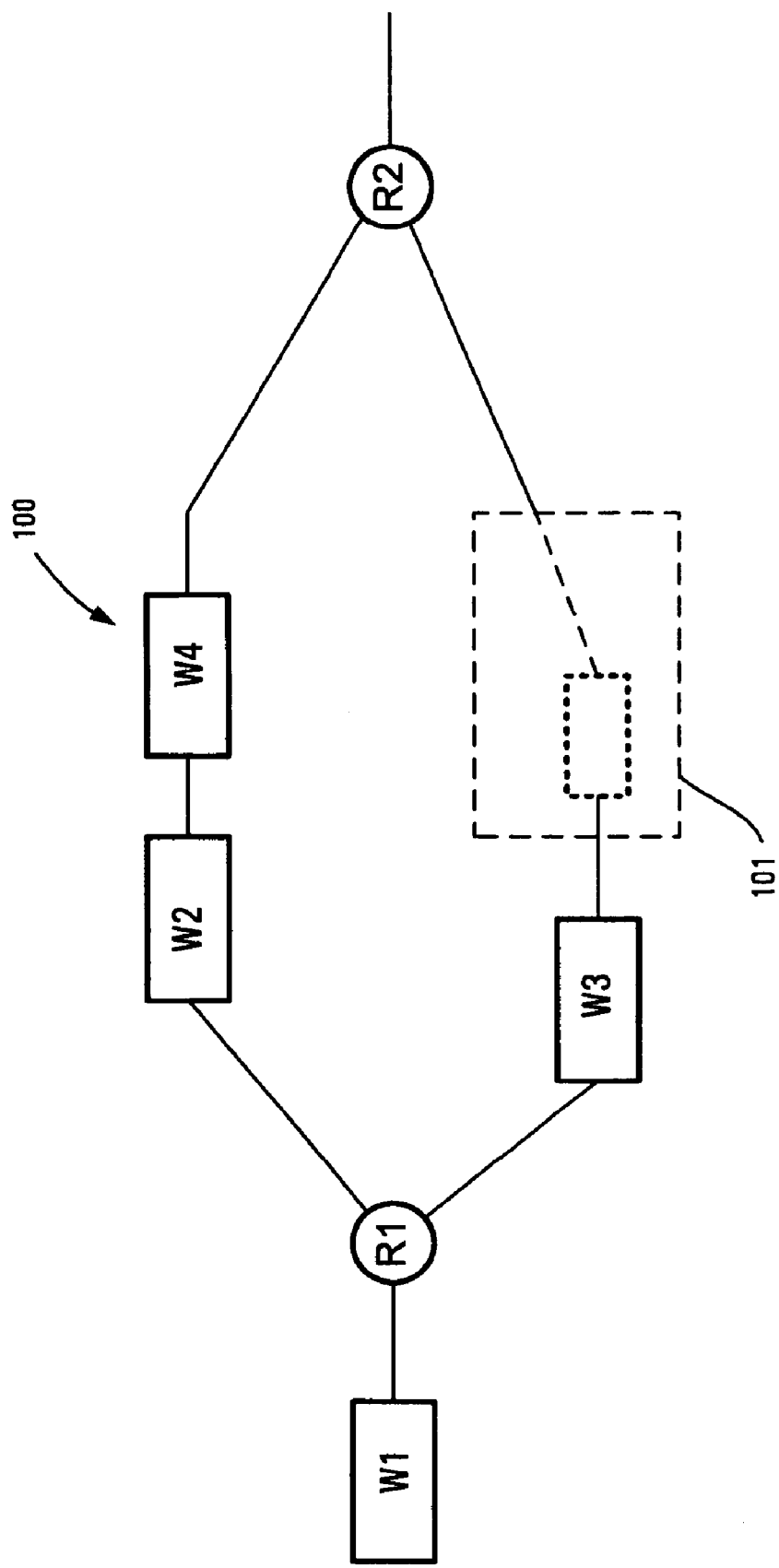
FIG. 1 is a schematic diagram of a process definition including a user-defined modification (illustrated in dotted lines)

In FIG. 1, a simple example is shown for an original process definition 100. The graph corresponding to the process definition 100 starts with a work node $W_1$ leading to a route node $R_1$, from which the execution path of the graph branches out to work nodes $w_2$, $w_4$ on one branch and work node $w_3$ on the other branch.

Also shown in FIG. 1 is a modification 101 of the original process definition 100 in so far as an additional work node W' is added after the work node $W_3$ in the lower branch of the modified process definition.

In FIG. 1 as well as in the following, dotted lines refer to a modification made to an original process definition. This means that the respective original definition is without these modifications (i.e. the dotted lines) and the process instances executing the respective process definition have to be migrated to the modified process definition.

For migrating each process instance during the execution of an original process definition, as and when a modification is defined by the user, each process instance is checked whether it meets a migration condition as described in the following.

The question whether a migration condition is met by a process instance depends on the current executing node (or the current executing set of nodes, respectively, if the process definition branches out like the one in FIG. 1). In the following, examples for defining a migration condition and the corresponding check of the process instance are explained:

"Total Migration"

In the following, "total migration" refers to a migration condition according to a preferred embodiment of the invention.

If total migration is performed for the process instances in a Workflow management system, a set of worst case migration points (WMP) has to be defined.

The criterions for defining the set of worst case migration points are:

1. The points (nodes) of migration should exist both in original process definition and in the modified process definition P' and provide points of continuity for migration; and
2. the current stage of execution should not have progressed beyond the points (nodes) of WMP.

The implication of the set WMP is that the migration condition is met for a process instance if the current state of execution for this process instance has not gone beyond one of the nodes in WMP. Consequently, if a running process instance is executing at a node which is beyond any node in the WMP, then this process instance cannot be totally migrated.

In the case of total migration either all or none of the changes made in the modified process definition go into the corresponding process instance. According to this, the migration condition of "total migration" is very rigid, but semantically relatively safe.

Figure 2A:
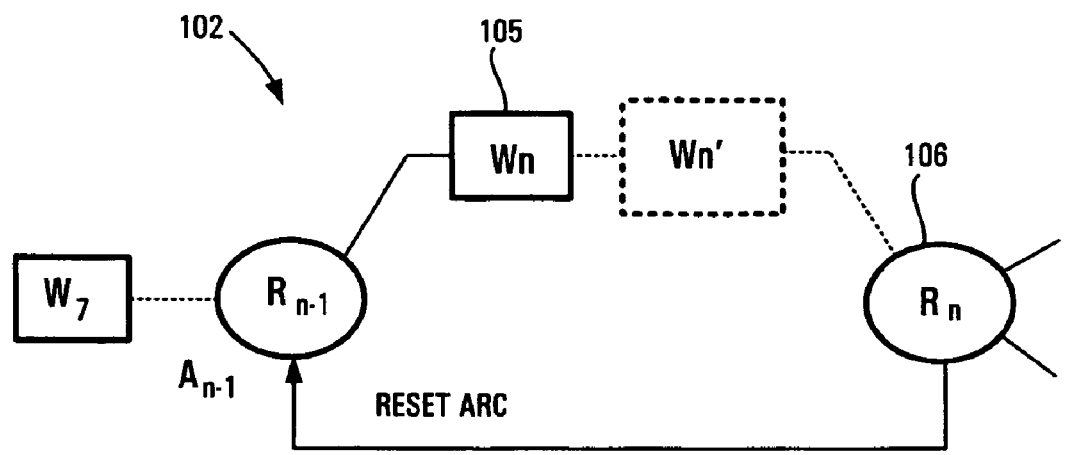
FIGS. 2a and 2b are modified process definitions including a reset arc.
Figure 2B:
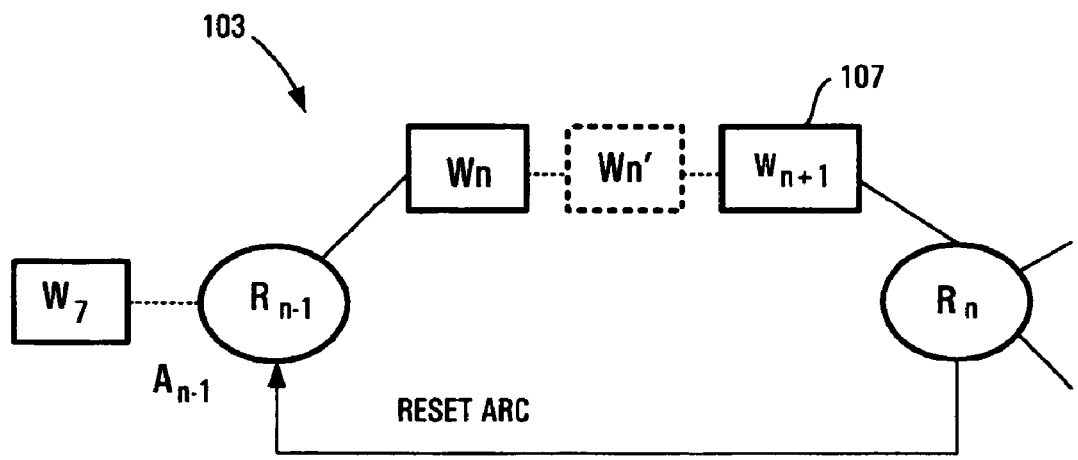

FIGS. 2a and 2b show examples for migration scenarios in original process definitions 102, 103 including a reset loop, with a work node $W_n$ and a route node $R_{n-1}$ being added in the corresponding modified process definition.

If in FIG. 2a the process instance is currently executing before the route node $R_{n-1}$, e.g. at work node $W_7$ (i.e. at execution point 104, then the process instance is migratable at work node $W_7$. If the process instance is currently executing at work node $W_n$ (i.e. at execution point 105), then the current reset loop can migrate to the modified process definition at $W_n$. If the current node of execution for the reset loop is $R_n$ (i.e. execution point 106), then the migration of the current reset loop is not possible. However, it is possible for the next reset loop that $R_{n-1}$ is the point of migration. It is important to note that although the node of execution during attempted migration was $R_n$, $R_{n-1}$ is the point of migration for the next reset loop. If in the process definition 103 of FIG. 2b the point of execution 107 is at $W_{n+1}$, then $R_{n-1}$ is the node of migration.

A set of possible changes which can be made in a process definition are listed below in Table 1:

TABLE 1

| 1 | Adding a work node with activity |
|---|---|
| 2 | Changing an activity for a work node to a subprocess |
| 3 | Changing the activity definition for a work node |
| 4 | Changing the activity associated with a work node |
| 5 | Deleting a work node |
| 6 | Changing the constituent activities of a subprocess |
| 7 | Adding/modifying/deleting case packet variables (read, write, add, list) |
| 8 | Adding/deleting a route node |
| 9 | Adding/modifying/deleting routes in a route node |
| 10 | Changing the implementation bound to an activity |

After a modified process definition has been specified by the user, this definition is compiled to make it free from errors and loaded into the process engine. In total migration, an input of worst case migration points WMP has to be available to the process engine during runtime. The set of worst case migration points WMP can also be an input from the user.

In cases where the user does not input the WMP, these points are computed taking a set D of changed nodes in the modified process definition. Then the set D of changed nodes has to be made available to the process engine as described below.

In the following, an algorithm is described to compute said set of worst case migration points WMP from a set D of changed nodes in the modified process definition. This algorithm is applied by the process engine for statically computing the set of worst case migration points WMP in cases where the user does not specify such WMP.

Figure 3:
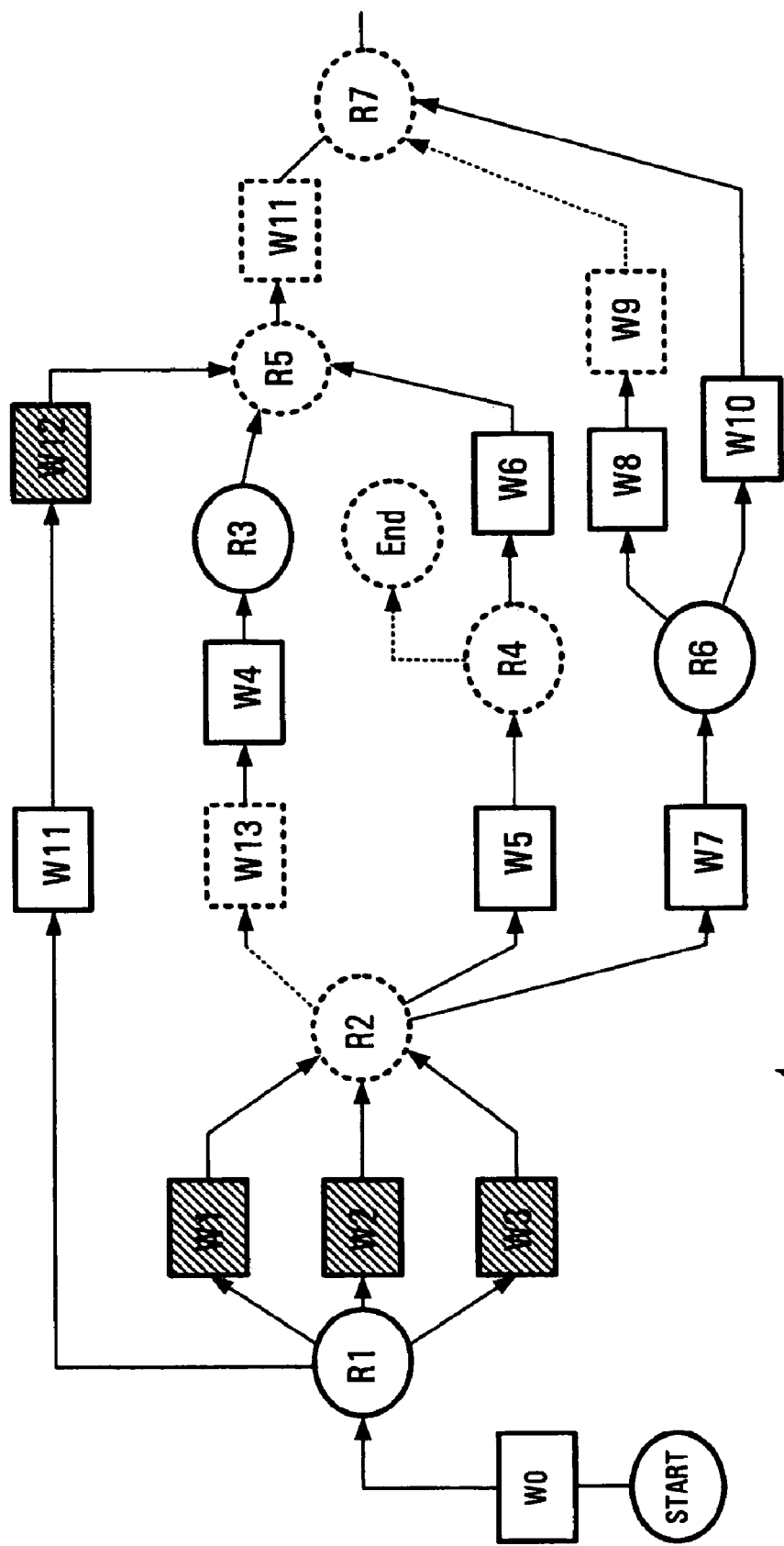
FIG. 3 is a process definition including several modifications to demonstrate an algorithm for computing a set of migration points for migrating a process instance of a WFMS according to a preferred embodiment of the invention.
Figure 4:
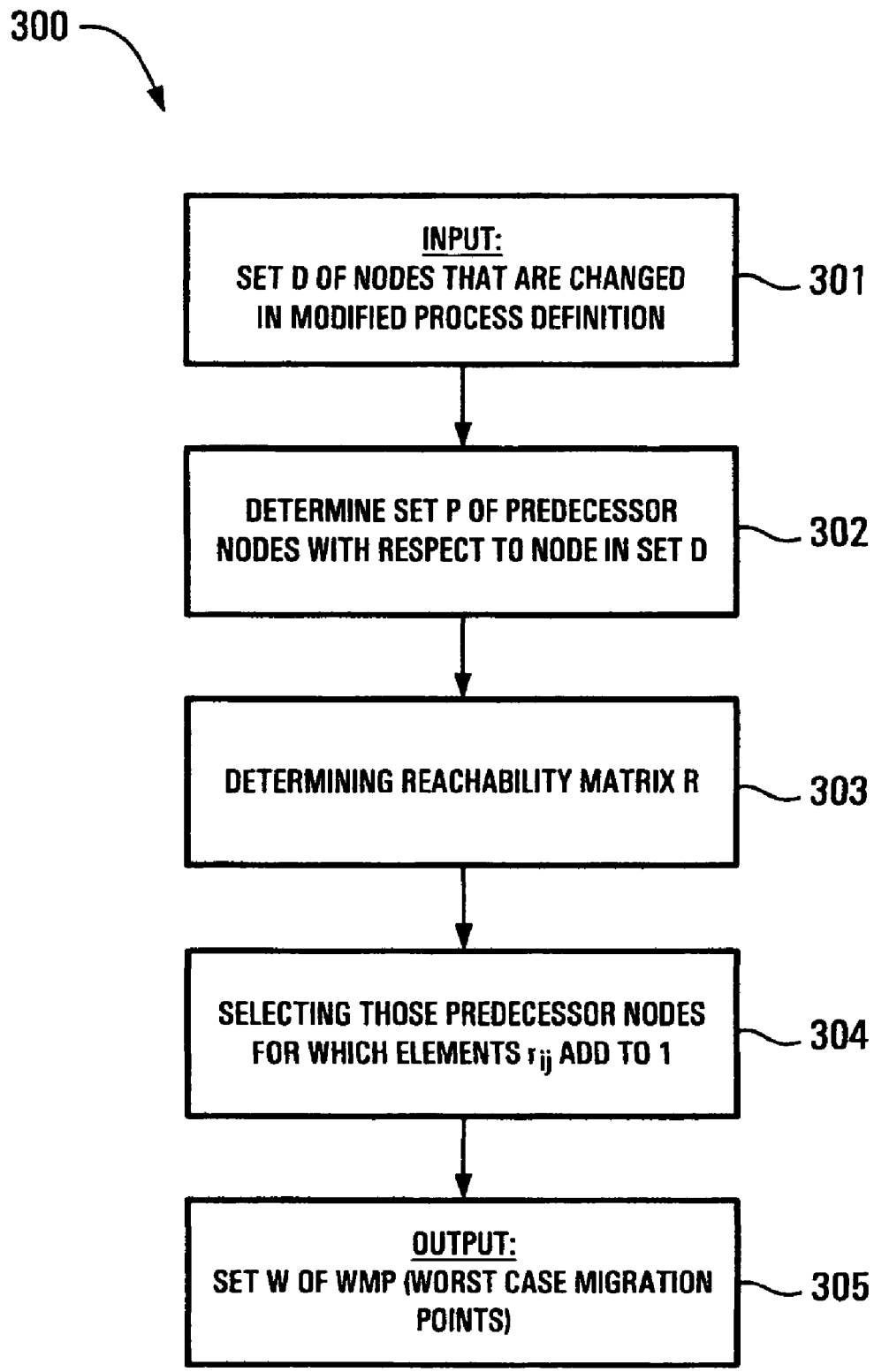
FIG. 4 is a flow chart illustrating an algorithm for computing a set of migration points according to a preferred embodiment of the invention.

The algorithm, for which a flow chart is shown in FIG. 4, is explained with respect to a further example of a process definition illustrated in FIG. 3.

FIG. 3 shows a process definition 200 wherein objects that are changed during modification are illustrated with dotted lines as already described above.

FIG. 4 shows a flow chart illustrating an algorithm 300 for calculating the set of worst case migration points WMP in such cases, where the user does not specify the worst case migration points WMP. The process engine uses the computed set of WMP during the actual migration at run-time as described above.

Let us apply this algorithm on the process definition 200. The first step 301 in the algorithm 300 is the input of a set D which includes all nodes that have changed in the modified process definition with respect to the original process definition.

The input set D comprises entries for deleted nodes also. However, changes adjacent to each other in the graph 200 are grouped in set D as one change and the first encountered node is taken as an element of set D. For example, route node $R_2$ and work node $W_{13}$ are grouped as one change and $R_2$ forms an element in set D. For the process definition, the input for set D will be the following:

$$D=\{R_2, W_{13}, R_4, R_5, W_{11}, R_7, W_9\}.$$

In a next step 302 a set P is determined, which includes all predecessor nodes in the process definition 200 for the nodes belonging to set D.

A DeleteFlag is used for determining the predecessor nodes for the deleted node. When the DeleteFlag is set, the corresponding predecessor nodes are obtained from the original process 200, since the corresponding nodes exist only in the original process definition 200 and have been deleted in the modified process definition. The actual nodes corresponding to these node names are picked up from the modified process definition. For the example of the process definition 200 in FIG. 3, set P is determined as follows:

$$P=\{W_1, W_2, W_3, W_{12}, R_3, W_6, W_8, W_{10}, W_5\}$$

In a next step 303, a reachability matrix $R=(R_{ij})$ for the nodes belonging to set P is determined, which includes the information whether nodes belonging to set P are reachable from each other or not.

In the reachability matrix R each row and column represents a node in the order listed in P. A node X representing a column is regarded as reachable from a node Y representing a row, if there exists a path of arcs forward from X to Y. In such a case the matrix element $r_{xy}$ obtains a value of 1. If Y is not reachable from X then $r_{xy}$ will have a value 0. Also for any node Z, $r_{zz}$ will be set to 1.

Of course, it is also possible to choose other values for the matrix elements other than 0 or 1.

Accordingly, the reachability matrix R corresponding to the above-listed set P is the following:

|        | $W_1$ | $W_2$ | $W_3$ | $W_{12}$ | $R_3$ | $W_6$ | $W_8$ | $W_{10}$ | $W_5$ |
|--------|-------|-------|-------|----------|-------|-------|-------|----------|-------|
| $W_1$  | 1     | 0     | 0     | 0        | 1     | 1     | 1     | 1        | 1     |
| $W_2$  | 0     | 1     | 0     | 0        | 1     | 1     | 1     | 1        | 1     |
| $W_3$  | 0     | 0     | 1     | 0        | 1     | 1     | 1     | 1        | 1     |
| $W_{12}$ | 0   | 0     | 0     | 1        | 0     | 0     | 0     | 0        | 0     |
| $R_3$  | 0     | 0     | 0     | 0        | 1     | 0     | 0     | 0        | 0     |
| $W_6$  | 0     | 0     | 0     | 0        | 0     | 1     | 0     | 0        | 0     |
| $W_8$  | 0     | 0     | 0     | 0        | 0     | 0     | 1     | 0        | 0     |
| $W_{10}$ | 0   | 0     | 0     | 0        | 0     | 0     | 0     | 1        | 0     |
| $W_5$  | 0     | 0     | 0     | 0        | 0     | 0     | 0     | 0        | 1     |

It is important to note that the actual order of the elements in set P is of no relevance to the algorithm.

In a next step 304, the set of worst case migration points is determined from the reachability matrix R by selecting those predecessor nodes in the set P which are not reachable from any other node. This is equivalent to saying that all the elements from the corresponding column add to a value of one in the reachability matrix R. Accordingly, if the addition of elements in a column in the reachability matrix R results in a value of one, then the predecessor node in set P corresponding to that column is taken as a member of the set of worst migration points WMP. In the above matrix R, the columns corresponding to the predecessor nodes $W_1$, $W_2$, $W_3$ and $W_{12}$ add to a value of one.

Consequently, a set $$W=\{W_1, W_2, W_3, W_{12}\}$$

is obtained containing the worst case migration points to perform the total migration. The set W represents the output of algorithm 300 (step 305). The corresponding nodes are hatched in the graph of FIG. 3.

As explained above, for "total migration", a migration is not possible if a process instance is currently executing at a node which is beyond any of the worst case migration points WMP in set W.

What is claimed is:

1. A method for executing a work flow in a workflow management system (WFMS) having at least one process instance executing an original process definition, and migrating the said process instance to a changed process definition, said method comprising:
    a) checking each process instance during the execution of the original process definition whether the process instance meets a migration condition, wherein checking each process instance comprises defining a set of worst case migration points (WMP) by reading the set of worst case migration points (WMP) from an user input, or computing the set of worst case migration points (WMP) based upon the original process definition and the modified process definition, the computing of the set of worst case migration points (WMP) comprises:
    defining a set D including all nodes that are changed in the modified process definition with respect to the original process definition;
    determining a set P including all predecessor nodes for all nodes belonging to set 0;
    determining a reachability matrix $R=(r_{ij})$ for all nodes belonging to set P, each row and column in the reachability matrix R representing a node in the order listed in P, wherein a node X representing a column is regarded as reachable from a another node Y representing a row, if there exists a path of arcs forward from X to Y; and
    determining the set of worst case migration points from the reachability matrix R
    b) migrating the process instance to the modified process definition if its execution has not gone beyond anyone of said worst case migration points (WMP), thereby meeting the migration condition, such that said process instance executes said changed process definition.

2. A method according to claim 1, wherein determining the reachability matrix $R=(r_{ij})$ further comprises:
    attributing a valued x to each reachability matrix element $r_{ij}$ if the predecessor node corresponding to said column j is reachable from the node corresponding to said row T;
    attributing a value of x to each reachability matrix element $r_{zz}$ and
    attributing a value of y to each reachability matrix element $r_{ij}$ if the predecessor node corresponding to said column j is not reachable from the node corresponding to said row i.

3. A method according to claim 2, wherein the worst case migration points are determined by selecting those predecessor nodes for which the elements $r_{ij}$ from the corresponding column add to a value of x.

4. A method according to claim 3, wherein a value of 1 is chosen for x and a value of 0 is chosen for y.

* * * * *

UNITED STATES PATENT AND TRADEMARK OFFICE
CERTIFICATE OF CORRECTION

PATENT NO.         : 7,406,424 B2                                Page 1 of 1
APPLICATION NO.    : 09/943027
DATED              : July 29, 2008
INVENTOR(S)        : Lakshmi Kutty Cheeniyil et al.

It is certified that error appears in the above-identified patent and that said Letters Patent is hereby corrected as shown below:

In column 5, line 29, before "R3" insert -- R = --.

In column 6, line 41, in Claim 2, delete "valued" and insert -- value --, therefor.

In column 6, line 41, in Claim 2, after "valued" insert -- of --.

In column 6, line 43, after "row" delete "T;" and insert -- i; --, therefor.

Signed and Sealed this

Twenty-eighth Day of October, 2008

JON W. DUDAS
*Director of the United States Patent and Trademark Office*